United States Patent
Sakai et al.

(10) Patent No.: US 9,060,042 B2
(45) Date of Patent: *Jun. 16, 2015

(54) CONTROL APPARATUS AND CONTROL METHOD

(71) Applicant: Sony Corporation, Tokyo (JP)

(72) Inventors: Yusuke Sakai, Kanagawa (JP); Masao Kondo, Tokyo (JP)

(73) Assignee: Sony Corporation (JP)

( * ) Notice: Subject to any disclaimer, the term of this patent is extended or adjusted under 35 U.S.C. 154(b) by 0 days.

This patent is subject to a terminal disclaimer.

(21) Appl. No.: 14/283,626

(22) Filed: May 21, 2014

(65) Prior Publication Data

US 2014/0258407 A1  Sep. 11, 2014

Related U.S. Application Data

(63) Continuation of application No. 13/234,840, filed on Sep. 16, 2011, now Pat. No. 8,773,496.

(30) Foreign Application Priority Data

Sep. 29, 2010 (JP) ................. P2010-219865

(51) Int. Cl.
*H04N 7/14* (2006.01)
*H04L 29/06* (2006.01)
(Continued)

(52) U.S. Cl.
CPC ............ *H04L 65/403* (2013.01); *H04N 7/15* (2013.01); *H04N 21/233* (2013.01); *H04N 21/252* (2013.01); *H04N 21/4396* (2013.01); *H04N 21/44029* (2013.01); *H04N 21/4788* (2013.01)

(58) Field of Classification Search
USPC ............. 348/14.01, 14.03, 14.1, 14.07; 379/93.21, 158, 202.01, 204.01
See application file for complete search history.

(56) References Cited

U.S. PATENT DOCUMENTS 5,692,042 A    11/1997   Sacca
6,125,175 A     9/2000   Goldberg et al.
(Continued)

FOREIGN PATENT DOCUMENTS

JP    2007-036685 A    2/2007

OTHER PUBLICATIONS

Zhou Z et al: "An experimental study on the role of 3D sound in augmented reality environment" Interacting With Computers, Butterworth-Heinemann, GB, vol. 16, No. 6, Dec. 1, 2004, pp. 1043-1068, XP 004654624.

(Continued)

*Primary Examiner* — Olisa Anwah
(74) *Attorney, Agent, or Firm* — Lerner, David, Littenberg, Krumholz & Mentlik, LLP

(57) ABSTRACT

Systems and methods for selective content sharing with a communication target apparatus are provided. In various aspects, communication with a communication target apparatus may be established, and content indicated by content data may be reproduced, where the reproduced content may represent audio or audio and image content. A determination may be made whether or not to share the reproduced content indicated by the content data with the communication target apparatus and a process to share or not share the reproduced content indicated by the content data with the communication target apparatus may be selectively performed. When the reproduced content is determined not to be shared with the communication target apparatus, a generated speech audio signal may be shared with the communication target apparatus while the reproduced content indicated by the content data may not shared with the communication target apparatus.

16 Claims, 7 Drawing Sheets

(51) Int. Cl.
*H04N 7/15* (2006.01)
*H04N 21/233* (2011.01)
*H04N 21/25* (2011.01)
*H04N 21/439* (2011.01)
*H04N 21/4402* (2011.01)
*H04N 21/4788* (2011.01)

(56) References Cited

U.S. PATENT DOCUMENTS

| | | | |
|---|---|---|---|
| 6,407,325 B2 | 6/2002 | Yi et al. | |
| 6,583,806 B2 * | 6/2003 | Ludwig et al. | 348/14.08 |
| 7,058,689 B2 | 6/2006 | Parker et al. | |
| 7,564,476 B1 * | 7/2009 | Coughlan et al. | 348/14.08 |
| 8,204,186 B2 | 6/2012 | Kovales et al. | |
| 8,396,197 B2 | 3/2013 | Jiang | |
| 8,473,851 B2 * | 6/2013 | DeGrazia | 715/753 |
| 2003/0005462 A1 | 1/2003 | Broadus et al. | |
| 2004/0024819 A1 * | 2/2004 | Sasaki et al. | 709/205 |
| 2004/0145654 A1 | 7/2004 | Motohashi | |
| 2006/0002315 A1 * | 1/2006 | Theurer et al. | 370/261 |
| 2006/0152575 A1 * | 7/2006 | Amiel et al. | 348/14.01 |
| 2007/0010283 A1 * | 1/2007 | Kim | 455/550.1 |
| 2007/0153091 A1 | 7/2007 | Watlington et al. | |
| 2008/0012935 A1 * | 1/2008 | Echtenkamp | 348/14.02 |
| 2008/0117282 A1 * | 5/2008 | Cho | 348/14.1 |
| 2008/0177282 A1 * | 7/2008 | Lee et al. | 606/130 |
| 2008/0307324 A1 * | 12/2008 | Westen et al. | 715/753 |
| 2011/0064243 A1 * | 3/2011 | Katayama et al. | 381/97 |
| 2011/0113335 A1 * | 5/2011 | Rouse et al. | 715/723 |

OTHER PUBLICATIONS

Alam M S et al: "Figurative Privacy Control of SIP-Based Narrowcasting", Advanced Information Networking and Applications, 2008. AINA 2008. 22ND International Conference on, IEEE, Piscataway, NJ. USA, Mar. 25, 2008, pp. 726-733, XP 031240707.
European Search Report EP 11181987, dated Feb. 2, 2012.

* cited by examiner

FIG. 1

| COMMUNICATION STATE RELATING TO TELEPHONE CALL \ CONTENT REPRODUCTION STATE | A NO CONTENT DATA IS REPRODUCED | B CONTENT NON-SHARING STATE | C CONTENT SHARING STATE |
|---|---|---|---|
| DURING COMMUNICATION | ONLY CONVERSATION BETWEEN USERS IS PRESENTED | INDIVIDUAL CONTENT AND CONVERSATION BETWEEN USERS ARE SEPARATED AND PRESENTED | SHARED CONTENT AND CONVERSATION BETWEEN USERS ARE INTEGRATED AND PRESENTED |

CONTROL APPARATUS AND CONTROL
METHOD

CROSS-REFERENCE TO RELATED APPLICATIONS

The present application is a continuation of U.S. patent application Ser. No. 13/234,840, filed Sep. 16, 2011, which claims priority from Japanese Priority Patent Application JP 2010-219865 filed in the Japan Patent Office on Sep. 29, 2010, the disclosures of which are hereby incorporated herein by reference.

BACKGROUND

The present technology relates to a control apparatus and a control method.

In recent years, for example, there have continued to spread apparatuses such as personal computers (PCs) or the like that are capable of establishing communication, which relates to a telephone call between users, with external apparatuses while reproducing content data.

In such a situation, a technology has been developed in which a content is shared between a plurality of apparatuses that perform communication relating to a telephone call. Japanese Unexamined Patent Application Publication No. 2007-36685 discloses an example of a technology that provides, to a plurality of users at remote locations, a realistic sensation such as a sense that they watch a video content at a same location.

SUMMARY

In a control apparatus (hereinafter, simply referred to as "control apparatus of the related art") to which a technology of the related art (hereinafter, simply referred to as "technology of the related art") is applied, the technology of the related art allowing a content to be shared between a plurality of apparatuses that establish communication relating to a telephone call, an image indicated by shared content data and an image of a user who makes a telephone call are combined, and the composite image is displayed on a display screen. In addition to the display of the composite image on the display screen, the control apparatus of the related art performs sound image localization according to a preliminarily set position of the image of the user, with respect to speech audio relating to the telephone call. Accordingly, using the technology of the related art, a realistic sensation such as a sense that users watch a video content at a same location may be provided to the users who use individual apparatuses that establish communication relating to a telephone call.

Here, when communication relating to the telephone call is established between the plural apparatuses, it is not necessarily the case that a user constantly desires to share content with a communication partner. For example, in a case in which communication relating to a telephone call is started when content data is reproduced in an apparatus, a user of the apparatus may not want a user of an apparatus that is a communication target (hereinafter, indicated as "communication target apparatus") establishing communication relating to the telephone call to be aware of the content of audio (an example of a content) indicated by the content data the former user enjoys. Accordingly, for example, in a case in which the user of an apparatus does not desire to share, when the user of the communication target apparatus is aware of the content of audio indicated by the content data the former user enjoys, the privacy of the user of the apparatus may be invaded.

However, in the technology of the related art, for example, the prevention of such invasion of the privacy of the user as described above is not considered. Accordingly, even if the control apparatus of the related art is used, it is difficult to desire to cause a content indicated by the content data to be selectively shared with the communication target apparatus with preventing the invasion of the privacy of the user when communication relating to the telephone call is established with the communication target apparatus.

The present technology addresses the above-mentioned problems. In addition, it is desirable to provide a new and improved control apparatus and a new and improved control method, which are capable of causing a content indicated by the content data to be selectively shared with the communication target apparatus with preventing the invasion of the privacy of the user when communication relating to the telephone call is established with the communication target apparatus.

In view of the foregoing, a control apparatus for selective content sharing with a communication target apparatus is provided. The control apparatus may include a processor and a memory storing content data and instructions. The instructions, when executed by the processor, may cause the processor to establish communication with a communication target apparatus and reproduce content indicated by the content data, where the reproduced content may represent audio or audio and image content. The instructions may also cause the processor to determine whether or not to share the reproduced content indicated by the content data with the communication target apparatus and, selectively perform, in accordance with a result of the determination, a process to share or not share the reproduced content indicated by the content data with the communication target apparatus. When the reproduced content indicated by the content data is determined not to be shared with the communication target apparatus, a generated speech audio signal may be shared with the communication target apparatus and the reproduced content indicated by the content data may not shared with the communication target apparatus. When the reproduced content indicated by the content data is determined to be shared with the communication target apparatus, the generated speech audio signal may be shared with the communication target apparatus and the reproduced content indicated by the content data may also shared with the communication target apparatus.

In another aspect, the processor may be configured to add an inverted content audio signal to the audio represented by the reproduced content. In one embodiment, the inverted content audio signal may be obtained by inverting a phase of the audio represented by the reproduced content.

In yet another aspect, processor may be configured to mask the image represented by the reproduced content. In one embodiment, the processor may mask the image represented by the reproduced content by removing a portion of the image represented by the reproduced content. In another embodiment, the processor may masks the image represented by the reproduced content by adding a mosaic to a portion of the image represented by the reproduced content.

In another aspect, the generated speech audio signal that is shared by the control apparatus with the communication target apparatus may include a signal representing speech received from a user of the control apparatus.

In a further aspect, the processor in the control apparatus may be configured to add an inverted speech audio signal to the generated speech audio signal shared with the communication target apparatus. In one embodiment, the inverted speech audio signal may be obtained by inverting a phase of a speech signal received from a user of the communication target apparatus.

In yet another aspect, the control apparatus may include an input unit for receiving a captured image and the processor may be configured to share the captured image with the communication target apparatus. In one embodiment, the processor in the control apparatus may modify the captured image received by the input unit and share the modified captured image with the communication target apparatus. In one embodiment, the captured image may be modified by replacing a portion of the captured image with an avatar.

In still another aspect, the control apparatus may include a display and the processor may be configured to display the captured image and the image represented by the reproduced content to a user on the display. In one embodiment, the processor may display the captured image and the image represented by the reproduced content to the user in different regions of the display. In a yet another embodiment, the different regions in which the captured image and the image represented by the reproduced content are displayed may provide visual notification to the user that the captured image is being shared with the communication target apparatus and that the image represented by the reproduced content is not being shared with the communication target apparatus.

In yet another aspect, the processor in the control apparatus may be configured to modify the audio represented by the reproduced content. In one embodiment, the processor may modify the audio represented by the reproduced content by adding a reverberant sound effect to the audio represented by the reproduced content.

In various aspects, the control apparatus may be implemented in a telephone, computer, set top box, mobile phone, or game machine.

A non-transitory computer-readable medium on which computer readable instructions of a program are stored is provided. The instructions, when executed by a processor, may cause the processor to establish communication with a communication target apparatus and reproduce content indicated by content data, where the reproduced content represents audio or audio and image data. The instructions may further configure the processor to determine whether or not to share the reproduced content indicated by the content data with the communication target apparatus and selectively perform, in accordance with a result of the determination, a process to share or not share the reproduced content indicated by the content data with the communication target apparatus. When the reproduced content indicated by the content data is determined not to be shared with the communication target apparatus, a generated speech audio signal may be shared with the communication target apparatus while the reproduced content indicated by the content data may not shared with the communication target apparatus. When the reproduced content indicated by the content data is determined to be shared with the communication target apparatus, the generated speech audio signal may be shared with the communication target apparatus and the reproduced content indicated by the content data may also shared with the communication target apparatus.

A method for performing selective content sharing is provided. The method may include establishing communication with a communication target apparatus and reproducing content indicated by content data, where the reproduced content represents audio or audio and image content. The method may further include determining, with a processor, whether or not to share the reproduced content indicated by the content data with the communication target apparatus and selectively performing, in accordance with a result of the determining, a process for sharing or not sharing the reproduced content indicated by the content data with the communication target apparatus. When the reproduced content indicated by the content data is determined not to be shared with the communication target apparatus, the method may include sharing a generated speech audio signal with the communication target apparatus and not sharing the reproduced content indicated by the content data with the communication target apparatus. When the reproduced content indicated by the content data is determined to be shared with the communication target apparatus, the method may include sharing the generated speech audio signal with the communication target apparatus and sharing the reproduced content indicated by the content data with the communication target apparatus.

Using such systems and methods, it is possible to cause a content indicated by the content data to be selectively shared with the communication target apparatus with preventing the invasion of the privacy of a user when communication relating to a telephone call is established with the communication target apparatus.

BRIEF DESCRIPTION OF THE DRAWINGS

FIG. 1 is an explanatory diagram for explaining the summary of a content sharing approach in a control apparatus according to an embodiment of the present technology.

DETAILED DESCRIPTION OF EMBODIMENTS

Figure 2:
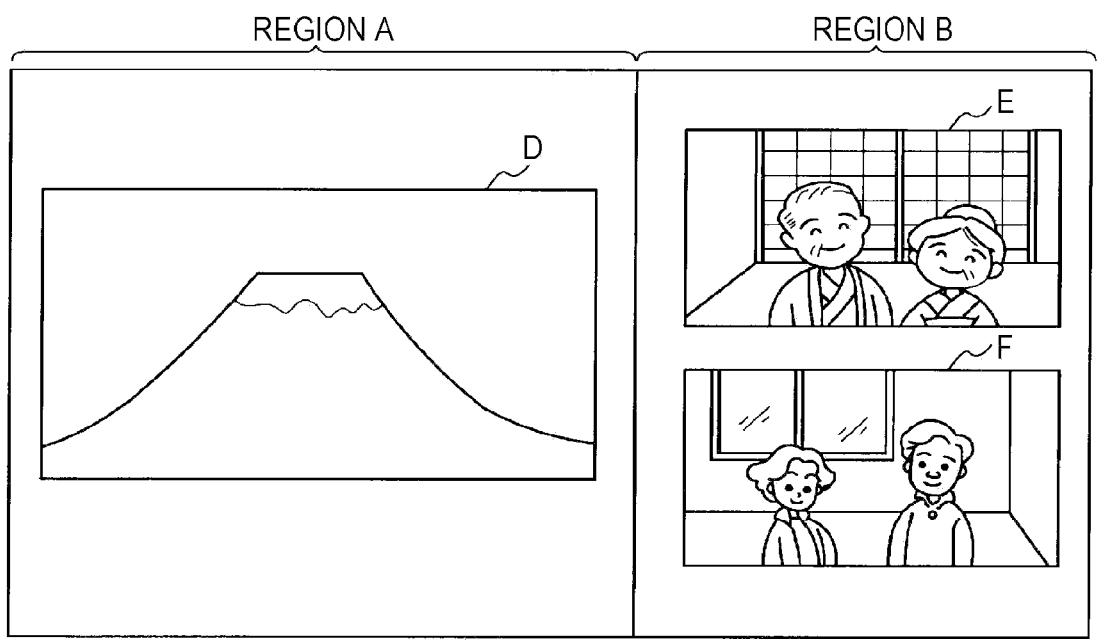
FIG. 2 is an explanatory diagram illustrating an example of a display image that the control apparatus according to an embodiment of the present technology causes to be displayed on a display screen in a content non-sharing state.

Hereinafter, preferred embodiments of the present technology will be described in detail with reference to figures. In addition, in the present specification and figures, a same symbol is assigned to a configuration element having a practically same functional configuration, and hence the duplicative description thereof will be omitted.

In addition, hereinafter, the description will be performed in the following order.

1. Approach According to Embodiment of Present Technology

2. Control Device According to Embodiment of Present Technology

3. Program According to Embodiment of Present Technology (Approach According to Embodiment of Present Technology)

Before the description of the configuration of a control apparatus (hereinafter, indicated as "control apparatus 100" in some cases) according to an embodiment of the present technology, a content sharing approach according to an embodiment of the present technology will be described. In addition, processing according to the content sharing approach according to an embodiment of the present technology, described as follows, may be treated as processing according to a control method according to an embodiment of the present technology.

In addition, hereinafter, a case in which the control apparatus 100 performs, in parallel, processing according to the reproduction of content data and processing according to a telephone call made between the control apparatus 100 and one or more communication target apparatuses will be cited as an example and described. Here, the term "content data" according to an embodiment of the present technology is data indicating audio or audio and an image (moving image/still image). Hereinafter, in some case, the reproduced audio or audio and an image, indicated by content data, are collectively indicated as "content". For example, music data, video data, or the like may be cited as the content data. In addition, while, for example, the control apparatus 100 reproduces content data stored in a storage unit (described later) or content data received from an external apparatus such as a server or the like, content data reproduced by the control apparatus 100 is not limited to such examples as described above. For example, by receiving (directly, or indirectly through an antenna, a tuner, or the like) a broadcast wave transmitted from a television tower or the like, the control apparatus 100 can also obtain content data from the outside and reproduce the content data.

In addition, while, as communication relating to a telephone call according to an embodiment of the present technology, for example, communication relating to a telephone call based on audio may be cited, the communication relating to a telephone call according to an embodiment of the present technology is not limited to such an example as described above. For example, the communication relating to a telephone call according to an embodiment of the present technology may be communication relating to a telephone call (for example, a video telephone call) based on a captured image and audio. In addition, the communication relating to a telephone call according to an embodiment of the present technology may be communication relating to a telephone call based on a still image and audio. Here, the term "captured image" according to an embodiment of the present technology is a moving image (or, the aggregate of still images successively captured in a temporal axis direction) captured by imaging. In addition, in communication relating to a telephone call (for example, a video telephone call) based on a captured image and audio, made between the control apparatus 100 according to an embodiment of the present technology and a communication target apparatus, an image in which an imaged user included in a captured image is replaced with another character (so-called avatar) may be transmitted and received, as a captured image, between the control apparatus 100 and the communication target apparatus.

[Summary of Content Sharing Approach]

A same content is shared between a control apparatus and a communication target apparatus, for example, in such a way as in a case in which the technology of the related art is used, and hence it is possible for a user of the control apparatus and a user of the communication target apparatus to enjoy the same content while making a telephone call. Namely, the same content is shared between the control apparatus and the communication target apparatus, and hence it is possible to provide, to the users, a sense that they enjoy the content at a same location even if the control apparatus and the communication target apparatus are located at remote locations. Accordingly, the same content is shared between the control apparatus and the communication target apparatus, and hence it is possible to improve convenience for the users.

On the other hand, as described above, for example, in a case in which the user of the control apparatus does not desire to share a content, when the user of the communication target apparatus is aware of the content of audio indicated by the content data the former user enjoys, the privacy of the user of the control apparatus may be invaded.

Accordingly, on the basis of the reproduction state of content data, the control apparatus 100 according to an embodiment of the present technology selectively performs processing (hereinafter, indicated as "content sharing processing" in some cases) according to sharing of a content indicated by the content data or processing (hereinafter, indicated as "content non-sharing processing" in some cases) for preventing a content indicated by reproduced content data from being shared with the communication target apparatus.

More specifically, the control apparatus 100 determines whether or not the content indicated by the content data is to be shared with the communication target apparatus. In addition, when, in the above-mentioned determination, it is determined that the content indicated by the content data is to be shared, the control apparatus 100 selectively performs the content sharing processing. In addition, when, in the above-mentioned determination, it is not determined that the content indicated by the content data is to be shared, the control apparatus 100 control apparatus 100 performs the content non-sharing processing.

FIG. 1 is an explanatory diagram for explaining the summary of a content sharing approach in the control apparatus 100 according to an embodiment of the present technology. Here, FIG. 1 illustrates the reproduction state of content data in the control apparatus 100 and the summary of processing relating to content data reproduction performed in each reproduction state, when the control apparatus 100 establishes communication relating to a telephone call with a communication target apparatus.

As illustrated in FIG. 1, when the control apparatus 100 establishes communication relating to a telephone call with the communication target apparatus, the control apparatus 100 selectively performs processing indicated in (1) to processing indicated in (3), illustrated as follows, as processing relating to content data reproduction, in response to three reproduction states illustrated in A in FIG. 1 to C in FIG. 1, for example.

(1) Processing Performed when no Content Data is Reproduced (Processing Performed in State A Illustrated in FIG. 1)

When no content data is reproduced, the control apparatus 100 transmits to the communication target apparatus an audio signal (hereinafter, indicated as "generated audio signal" in some cases) generated by an audio input device (audio input unit described later) included the self apparatus or an external audio input device (audio input apparatus described later), for example.

Here, the audio input device or the external audio input device is a device that a user of the control apparatus 100 (hereinafter, simply indicated as "user" in some cases) uses for making a telephone call to a user of the communication target apparatus. Namely, the generated audio signal according to an embodiment of the present technology includes an audio signal (hereinafter, referred to as "speech audio signal") corresponding to the speech audio of the user relating to the telephone call. Accordingly, by transmitting the generated audio signal to the communication target apparatus in communication relating to the telephone call, the control apparatus 100 can present the speech audio relating to the telephone call to the user of the communication target apparatus.

In addition, the audio signal included in the generated audio signal according to an embodiment of the present technology is not limited to the speech audio signal corresponding to the speech audio of the user. For example, the generated audio signal may include an audio signal (hereinafter, indicated as "output audio signal" in some cases) corresponding to audio output from an audio input device (audio output unit described later) included the self apparatus or an external audio input device (audio output apparatus described later). More specifically, for example, when the control apparatus 100 reproduces no content data, the generated audio signal may include, as an output audio signal, an audio signal (hereinafter, referred to as "external speech audio signal") corresponding to the speech audio of the user of the communication target apparatus relating to a telephone call, the audio signal being received by the control apparatus 100 from the communication target apparatus.

Here, when the control apparatus 100 transmits to the communication target apparatus the generated audio signal including the external speech audio signal, it may happen that the user of the communication target apparatus hears the speech audio made by the user of the communication target apparatus, in addition to the speech audio of the user of the control apparatus 100, for example.

Therefore, for example, the control apparatus 100 adds an inverted external speech audio signal, obtained by inverting the phase of the external speech audio signal, to the generated audio signal, and transmits, to the communication target apparatus, the generated audio signal to which the inverted external speech audio signal is added. For example, in such a way as described above, by transmitting, to the communication target apparatus, the generated audio signal to which the inverted external speech audio signal is added, the control apparatus 100 can prevent the user of the communication target apparatus from hearing the speech audio made by the user of the communication target apparatus.

Here, for example, the control apparatus 100 includes an adaptive filter such as Least Mean Square (LMS) or the like or an adder, and thereby performs the above-mentioned processing on the generated audio signal. In addition, a configuration used for realizing the above-mentioned processing for the generated audio signal, performed in the control apparatus 100 according to an embodiment of the present technology, is not limited to the above-mentioned example. For example, the control apparatus 100 includes an arbitrary configuration capable of realizing so-called echo cancellation, and thereby can realize the above-mentioned processing for the generated audio signal.

(2) Processing Performed when no Content Indicated by Reproduced Content Data is Shared (Content Non-Sharing Processing: Processing Performed in State B Illustrated in FIG. 1)

When no content indicated by reproduced content data is shared, the control apparatus 100 causes the speech audio signal to be transmitted to the communication target apparatus, and does not cause a reproduced audio signal (hereinafter, indicated as "content audio signal" in some cases) corresponding to audio indicated by the reproduced content data to be transmitted to the communication target apparatus.

As described above, the generated audio signal generated by the audio input device or the external audio input device is not limited to the speech audio signal corresponding to the speech audio of the user, and may include the output audio signal. In addition, when the control apparatus 100 reproduces content data, the output audio signal turns out to include the content audio signal. Here, when the control apparatus 100 transmits the generated audio signal including the content audio signal to the communication target apparatus, the user of the communication target apparatus hears audio indicated by the content data reproduced in the control apparatus 100, in addition to the speech audio of the user of the control apparatus 100, for example. Accordingly, when the generated audio signal including the content audio signal is transmitted to the communication target apparatus as described above, the privacy of the user may be invaded.

Therefore, for example, the control apparatus 100 adds an inverted content audio signal, obtained by inverting the phase of the content audio signal, to the generated audio signal, and transmits, to the communication target apparatus, the generated audio signal to which the inverted content audio signal is added. For example, in such a way as described above, by transmitting, to the communication target apparatus, the generated audio signal to which the inverted content audio signal is added, the control apparatus 100 can prevent the user of the communication target apparatus from hearing audio indicated by the content data reproduced in the control apparatus 100.

Here, for example, the control apparatus 100 includes an adaptive filter such as LMS or the like or an adder, and thereby performs the above-mentioned processing on the generated audio signal. In addition, the control apparatus 100 includes an arbitrary configuration capable of realizing so-called echo cancellation, and thereby can realize the above-mentioned processing for the generated audio signal.

In addition, in the same way as in the above-mentioned case (1), for example, the control apparatus 100 may further add the inverted external speech audio signal, obtained by inverting the phase of the external speech audio signal, to the generated audio signal, and transmit, to the communication target apparatus, the generated audio signal to which the inverted external speech audio signal is further added. For example, in such a way as described above, by transmitting, to the communication target apparatus, the generated audio signal to which the inverted external speech audio signal is further added, the control apparatus 100 can further prevent the user of the communication target apparatus from hearing the speech audio made by the user of the communication target apparatus.

For example, in such a way as described above, by transmitting, to the communication target apparatus, the generated audio signal to which the inverted content audio signal is added, the control apparatus 100 causes the speech audio signal to be transmitted to the communication target apparatus, and does not cause the content audio signal corresponding to the reproduced content data to be transmitted to the communication target apparatus. Accordingly, since the control apparatus 100 can prevent the user of the communication target apparatus from hearing audio indicated by the content data reproduced in the control apparatus 100, the control apparatus 100 can prevent the privacy of the user from being invaded.

In addition, when the control apparatus 100 establishes communication relating to a telephone call (for example, a video telephone call) based on a captured image and audio with the communication target apparatus, the control apparatus 100 prevents the privacy of the user from being invaded, by performing image processing on a captured image generated by an imaging device (imaging unit described later) included in the self apparatus or an external imaging device (imaging apparatus described later), for example. More specifically, the control apparatus 100 determines whether or not an image indicated by the reproduced content data is included in the captured image. In addition, when the image is included in the captured image, the control apparatus 100 performs image processing on an image portion (for example, the reflection of an image in a window or the like), which is indicated by the content data and included in the captured image. For example, while, as the image processing, processing for removing the image portion or mosaic processing may be cited, the above-mentioned image processing is not limited to the above-mentioned examples. For example, the control apparatus 100 may perform, as the above-mentioned image processing, arbitrary processing capable of masking the image portion which is indicated by the content data and included in the captured image.

In addition, for example, the control apparatus 100 visually notifies the user that a reproduction state in the control apparatus 100 is the content non-sharing state. FIG. 2 is an explanatory diagram illustrating an example of a display image that the control apparatus 100 according to an embodiment of the present technology causes to be displayed on a display screen in the content non-sharing state. Here, FIG. 2 illustrates an example of a display image when the control apparatus 100 and two communication target apparatuses establish communication, which relates to a telephone call (for example, a video telephone call) based on a captured image and audio, with one another. In addition, for example, the control apparatus 100 may cause the display image to be displayed on a display screen of a display device (display unit described later) included the self apparatus or cause the display image to be displayed on a display screen of an external display device (display apparatus described later) (hereinafter, in the same way).

As illustrated in FIG. 2, for example, the control apparatus 100 causes the display image to be displayed on the display screen, the display image being an image in which a region A used for displaying an image (D in FIG. 2) indicated by the content data and a region B used for displaying captured images (E and F in FIG. 2) transmitted from the communication target apparatuses and received by the control apparatus 100 are separated from each other. As illustrated in FIG. 2, the display image in which the region A and the region B are separated from each other is displayed on the display screen, and thereby the user can visually recognize the content non-sharing state. In addition, it should be understood that the display image that the control apparatus 100 causes to be displayed on the display screen in the content non-sharing state is not limited to the example illustrated in FIG. 2.

Here, for example, on the basis of an image (for example, D in FIG. 2) indicated by the content data and captured images (for example, E and F in FIG. 2), the control apparatus 100 generates the display image using a method such as Picture In Picture (PIP), Picture On Picture (POP), or the like and causes the display image to be displayed, for example. In addition, a generation method used for the display image in the control apparatus 100 according to an embodiment of the present technology is not limited to the above-mentioned example.

(3) Processing Performed when Content Indicated by Reproduced Content Data is Shared (Content Sharing Processing: Processing Performed in State C Illustrated in FIG. 1)

When a content indicated by reproduced content data is shared, the control apparatus 100 transmits, to the communication target apparatus, the generated audio signal generated by the audio input device or the external audio input device.

Here, since a content sharing state (C illustrated in FIG. 1) is a state in which a same content is shared between the user and the user of the communication target apparatus, the invasion of privacy may not occur even if the content audio signal indicating audio indicated by the content data reproduced by the control apparatus 100 is transmitted to the communication target apparatus. Accordingly, in the content sharing state, the control apparatus 100 does not perform processing for adding the inverted content audio signal to the generated audio signal in such a way as in the processing (content non-sharing processing) illustrated in the above-mentioned (2). In addition, in the same way as in the above-mentioned case (1), for example, the control apparatus 100 may further add the inverted external speech audio signal, obtained by inverting the phase of the external speech audio signal, to the generated audio signal, and transmit, to the communication target apparatus, the generated audio signal to which the inverted external speech audio signal is further added.

Figure 3:
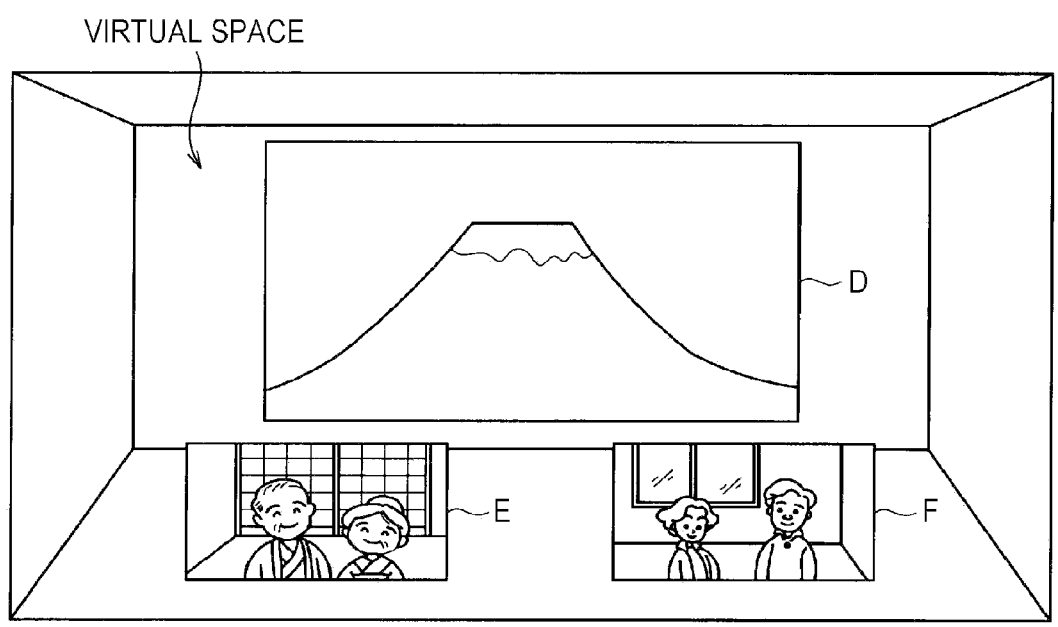
FIG. 3 is an explanatory diagram illustrating an example of a display image that the control apparatus according to an embodiment of the present technology causes to be displayed on a display screen in a content sharing state.

In addition, for example, the control apparatus 100 visually notifies the user that a reproduction state in the control apparatus 100 is the content sharing state. FIG. 3 is an explanatory diagram illustrating an example of a display image that the control apparatus 100 according to an embodiment of the present technology causes to be displayed on a display screen in the content sharing state. Here, FIG. 3 illustrates an example of a display image when the control apparatus 100 and two communication target apparatuses establish communication, which relates to a telephone call (for example, a video telephone call) based on a captured image and audio, with one another.

As illustrated in FIG. 3, for example, the control apparatus 100 causes the display image to be displayed on the display screen, the display image being an image in which an image (D in FIG. 3) indicated by the content data and captured images (E and F in FIG. 3) transmitted from the communication target apparatuses and received by the control apparatus 100 are arranged in a virtual space. As illustrated in FIG. 3, the display image in which the image (D in FIG. 3) indicated by the content data and the captured images (E and F in FIG. 3) are arranged in the virtual space is displayed on the display screen, and thereby the user can visually recognize the content sharing state. In addition, it should be understood that the display image that the control apparatus 100 causes to be displayed on the display screen in the content sharing state is not limited to the example illustrated in FIG. 3.

In addition, on the basis of the individual positions of the image (D in FIG. 3) indicated by the content data and the captured images (E and F in FIG. 3), in the virtual space, the control apparatus 100 individually localizes the sound images of the content audio signal and the external speech audio signal, output from the audio input device included in the self apparatus or the external audio input device. Here, for example, the control apparatus 100 preliminarily specifies the display position of the image indicated by the content data in the virtual space, and adds, for example, a sound effect such as reverberant sound or the like to audio indicated by the content audio signal, using an audio localization parameter preliminarily set for the preliminarily specified display position. In addition, in the same way as the above-mentioned content audio signal, the control apparatus 100 also adds a sound effect such as reverberant sound or the like to speech audio indicated by the external speech audio signal, using an audio localization parameter preliminarily set for each of preliminarily specified display positions, for example.

As described above, by individually localizing the sound images of the content audio signal and the external speech audio signal, output from the audio input device included in the self apparatus or the external audio input device, the control apparatus 100 can provide, to the user, a higher sense of a content shared between the user and the user of the communication target apparatus. In addition, a sound image localization method performed in the control apparatus 100 according to an embodiment of the present technology is not limited to the above-mentioned example, and an arbitrary method for individually localizing the sound images of the content audio signal and the external speech audio signal may be used as the sound image localization method.

In addition, for example, when the communication target apparatus has a configuration in which processing according to the content sharing approach according to an embodiment of the present technology is performed (namely, the communication target apparatus is another control apparatus 100), the communication target apparatus causes, for example, such a display image as illustrated in FIG. 3 to be displayed on a display screen and localizes a sound image, in the same way as the control apparatus 100, for example. Accordingly, in the above-mentioned case, since both the user of the control apparatus 100 and the user of the communication target apparatus feel as if the users enjoyed a content at a same location, the improvement of convenience for the users in a whole communication system in which communication relating to a telephone call is performed is achieved.

As described above, when no content data is reproduced, the control apparatus 100 performs the processing illustrated in the above-mentioned (1), for example. In addition, when content data is reproduced or content data is to be reproduced from now, the control apparatus 100 selectively performs, for example, the processing (content non-sharing processing) illustrated in the above-mentioned (2) or the processing (content sharing processing) illustrated in the above-mentioned (3), on the basis of the determination result as to whether or not a content indicated by the content data is to be shared with the communication target apparatus.

Here, when it is determined that the content indicated by the content data is to be shared with the communication target apparatus (namely, in a case of the content sharing state), the control apparatus 100 causes a speech audio signal and a content audio signal, which relate to a telephone call, to be transmitted to the communication target apparatus. Accordingly, since it is possible to provide, to the users, a sense that they enjoy the content at a same location even if the control apparatus 100 and the communication target apparatus are located at remote locations, the control apparatus 100 can achieve the improvement of convenience for users.

In addition, when it is not determined that the content indicated by the content data is to be shared with the communication target apparatus (namely, in a case of the content non-sharing state), the control apparatus 100 causes the speech audio signal to be transmitted to the communication target apparatus and does not cause the content audio signal to be transmitted to the communication target apparatus. Accordingly, since the control apparatus 100 can prevent the user of the communication target apparatus from hearing audio indicated by the content data reproduced in the control apparatus 100, the control apparatus 100 can prevent the privacy of the user from being invaded.

Accordingly, when the control apparatus 100 establishes communication relating to a telephone call with the communication target apparatus, the control apparatus 100 can cause a content indicated by the content data to be selectively shared with the communication target apparatus, with preventing the invasion of privacy of the user.

[Specific Example of Processing According to Content Sharing Approach]

Figure 4:
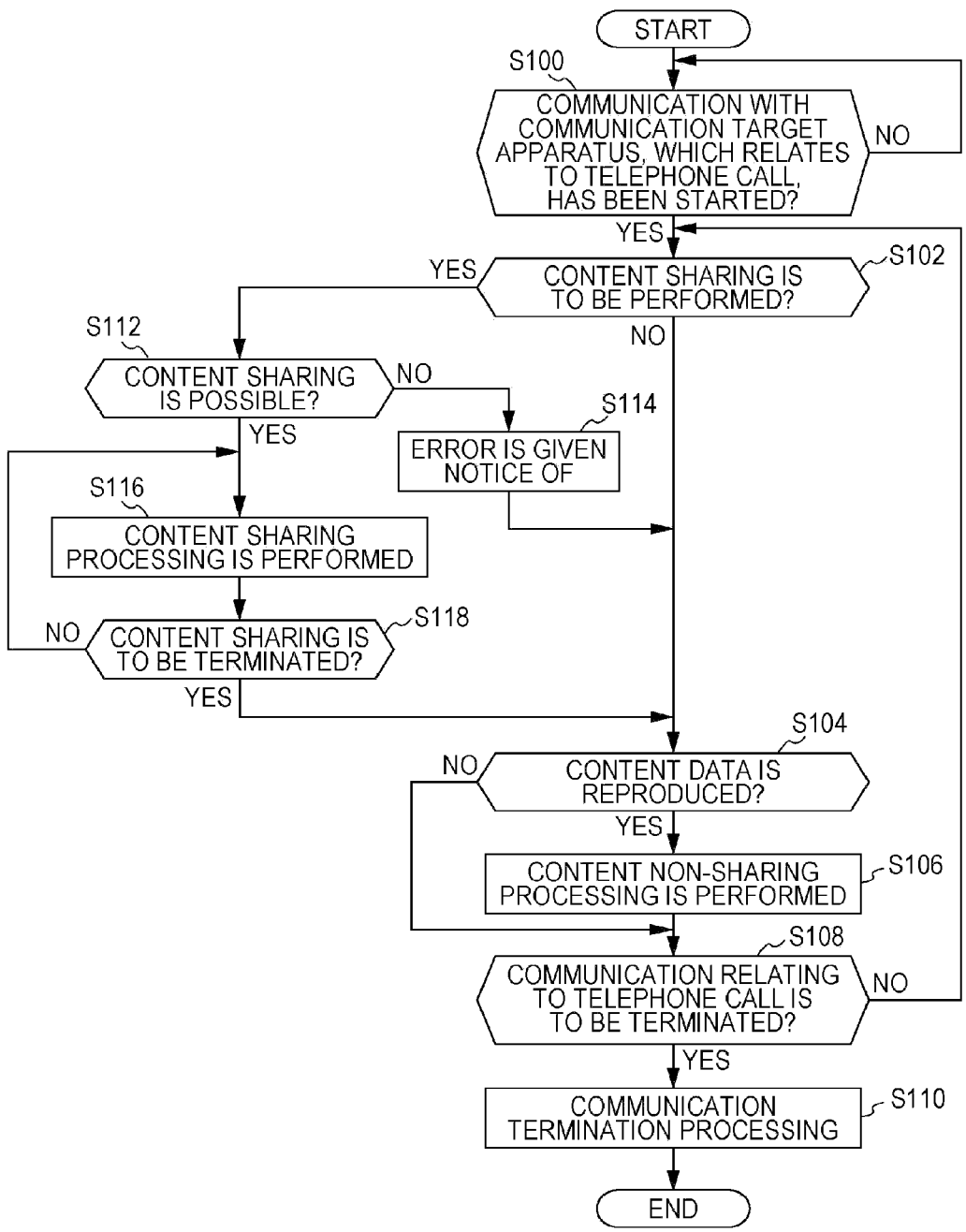
FIG. 4 is a flowchart illustrating an example of processing according to the content sharing approach in the control apparatus according to an embodiment of the present technology.

Next, an example of processing for realizing the above-mentioned content sharing approach according to an embodiment of the present technology will be described. FIG. 4 is a flowchart illustrating an example of processing according to the content sharing approach performed in the control apparatus 100 according to an embodiment of the present technology.

The control apparatus 100 determines whether or not communication with the communication target apparatus, which relates to a telephone call, has been started (S100). When, in Step S100, it is not determined that the communication with the communication target apparatus, which relates to a telephone call, has been started, the control apparatus 100 does not proceed with the processing until it is determined that the communication relating to a telephone call has been started.

In addition, when, in Step S100, it is determined that the communication with the communication target apparatus, which relates to a telephone call, has been started, the control apparatus 100 determines whether or not content sharing is to be performed between the control apparatus 100 and the communication target apparatus (S102).

Here, for example, on the basis of the state of a hardware switch used for specifying the on/off state of the content sharing or the state of a software switch used for specifying the on/off state of the content sharing on the basis of an external operation signal transmitted from an external operation apparatus such as a remote controller or the like, the control apparatus 100 performs the determination in Step S102. In addition, the processing in Step S102, performed in the control apparatus 100 according to an embodiment of the present technology, is not limited to the above-mentioned example.

For example, the control apparatus 100 may detect a predetermined movement of the user on the basis of a captured image, and determine whether or not the content sharing is to be performed between the control apparatus 100 and the communication target apparatus on the basis of the detection result. In the above-mentioned case, for example, by performing image processing on a captured image generated by the imaging device included in the self apparatus or the external imaging device, the control apparatus 100 detects the predetermined movement of the user included in the captured image (for example, the shape or the periodic movement of a hand or the like, which indicates the on/off state of the content sharing). In addition, for example, when an ON operation for the content sharing is detected, the control apparatus 100 determines that the content sharing is to be performed between the control apparatus 100 and the communication target apparatus. Here, for example, when an ON operation for the content sharing is detected, the control apparatus 100 determines that the content sharing is to be performed until an OFF operation for the content sharing is detected. However, the processing performed in the control apparatus 100 is not limited to the above-mentioned example. For example, when the control apparatus 100 gives notice of an error in Step S114 described later, the control apparatus 100 may not determine that the content sharing is to be performed, until the ON operation for the content sharing is detected again.

[1] Case in which it is not Determined that Content Sharing is to be Performed

When, in Step S102, it is not determined that the content sharing is to be performed between the control apparatus 100 and the communication target apparatus, the control apparatus 100 determines whether or not the content data is reproduced (S104).

When, in Step S104, it is not determined that the content data is reproduced, the control apparatus 100 performs processing in Step S108 described later. Here, when, in Step S104, it is not determined that the content data is reproduced, the control apparatus 100 performs processing according to communication relating to a telephone call, between the control apparatus 100 and the communication target apparatus. Namely, the processing performed in the control apparatus 100 when, in Step S104, it is not determined that the content data is reproduced corresponds to the processing illustrated in the above-mentioned (1).

In addition, when, in Step S104, it is determined that the content data is reproduced, the control apparatus 100 performs the content non-sharing processing (S106). Here, in Step S106, the control apparatus 100 performs processing illustrated in the above-mentioned (2). Namely, the processing in Step S106 is performed, and thereby it is possible to prevent the user of the communication target apparatus for hearing audio indicated by the content data reproduced in the control apparatus 100, for example. Therefore, the control apparatus 100 can prevent the privacy of the user from being invaded.

When, in Step S104, it is not determined that the content data is reproduced or when the processing in Step S106 is performed, the control apparatus 100 determines whether or not the processing according to the communication with the communication target apparatus, which relates to a telephone call, is to be terminated (S108). Here, for example, when an external operation signal transmitted from the external operation apparatus such as a remote controller or the like or an operation signal corresponding to a user operation, transmitted from an operation unit (described later) included in the self apparatus indicates the termination of the communication relating to a telephone call, the control apparatus 100 determines the communication relating to a telephone call is to be terminated. In addition, the processing in Step S108 is not limited to the above-mentioned example. For example, when, by performing image processing on a captured image, a predetermined movement of the user included in the captured image (for example, the shape or the periodic movement of a hand or the like, which indicates the termination of the communication relating to a telephone call) is detected, the control apparatus 100 may also determine that the communication relating to a telephone call is to be terminated.

When, in Step S108, it is not determined that the communication with the communication target apparatus, which relates to a telephone call, is to be terminated, the control apparatus 100 repeats the processing from Step S102.

In addition, when, in Step S108, it is determined that the communication with the communication target apparatus, which relates to a telephone call, is to be terminated, the control apparatus 100 terminates the communication with the communication target apparatus, which relates to a telephone call, by performing the truncation of a session or the like, for example (S110), and terminates the processing according to the content sharing approach. In addition, the processing according to the content sharing approach illustrated in FIG. 4 is not a kind of processing that is once terminated and not performed again, and the control apparatus 100 may repeat the processing according to the content sharing approach illustrated in FIG. 4 even if the processing is once terminated.

[2] Case in which it is Determined that Content Sharing is to be Performed

When, in Step S102, it is determined that the content sharing is to be performed between the control apparatus 100 and the communication target apparatus, the control apparatus 100 determines whether or not it is possible to perform content sharing between the control apparatus 100 and the communication target apparatus (S112). Here, for example, when the control apparatus 100 communicates with the communication target apparatus and it is determined that the content sharing is also to be performed in the communication target apparatus, the control apparatus 100 determines that it is possible to perform content sharing between the control apparatus 100 and the communication target apparatus. However, the processing in Step S112 is not limited to the above-mentioned example.

For example, when the control apparatus 100 communicates with a content management server performing license management for content data or the like, and content data corresponding to a content that a user desires to share is authenticated by the content management server (the sharing of the content data is allowed), the control apparatus 100 may determine that it is possible to perform content sharing between the control apparatus 100 and the communication target apparatus. Namely, the content management server according to an embodiment of the present technology fulfills a role for managing the sharing of the content data between the control apparatus 100 and the communication target apparatus.

As described above, when the sharing of a content is authenticated by the content management server, the sharing of the content is performed between the control apparatus 100 and the communication target apparatus. Therefore, even if both the user and the user of the communication target apparatus desire to share a content, no content is shared between the control apparatus 100 and the communication target apparatus. Accordingly, as described above, when the sharing of a content is authenticated by the content management server, the sharing of the content is performed between the control apparatus 100 and the communication target apparatus. Consequently, the license management for content data that is to be the target of sharing is realized.

When, in Step S112, it is not determined that it is possible to perform content sharing between the control apparatus 100 and the communication target apparatus, the control apparatus 100 notifies the user of an error (S114). In addition, the control apparatus 100 performs the processing from Step S104. Here, while, for example, by causing an error display screen to be displayed on the display screen, the control apparatus 100 visually notifies the user of an error, the processing in Step S114 is not limited to the above-mentioned example. For example, by causing the audio output device or the audio output apparatus to output audio indicating an error, the control apparatus 100 can also aurally notify the user of an error.

In addition, when, in Step S112, it is determined that it is possible to perform content sharing between the control apparatus 100 and the communication target apparatus, the control apparatus 100 performs the content sharing processing (S116). Here, in Step S116, the control apparatus 100 performs the processing illustrated in the above-mentioned (3). Namely, by performing the processing in Step S116, it is possible to provide, to the users, a sense that the users enjoy a content at a same location, even if the control apparatus 100 and the communication target apparatus are located at remote locations. Therefore, the control apparatus 100 can achieve the improvement of convenience for the users.

When the processing in Step S116 is performed, the control apparatus 100 determines whether or not the content sharing is to be terminated (S118). Here, for example, in the same way as in Step S102, on the basis of the state of the hardware switch or the software switch, a predetermined movement of the user detected from the captured image, or the like, the control apparatus 100 performs the determination in Step S118.

When, in Step S118, it is not determined that the content sharing is to be terminated, the control apparatus 100 repeats the processing from Step S116. In addition, when, in Step S118, it is determined that the content sharing is to be terminated, the control apparatus 100 repeats the processing from Step S104.

For example, by performing the processing illustrated in FIG. 4, the control apparatus 100 selectively performs the processing illustrated in the above-mentioned (1) to the processing illustrated in the above-mentioned (3), and realizes the processing according to the content sharing approach according to an embodiment of the present technology. Accordingly, for example, by performing the processing illustrated in FIG. 4, the control apparatus 100 can cause a content indicated by content data to be selectively shared with the communication target apparatus with preventing the invasion of the privacy of a user when the communication with the communication target apparatus, which relates to a telephone call, is established. In addition, it should be understood that the processing according to the content sharing approach performed in the control apparatus 100 according to an embodiment of the present technology is not limited to the processing illustrated in FIG. 4.

(Control Apparatus According to Embodiment of Present Technology)

Next, an example of the configuration of the control apparatus 100 according to an embodiment of the present technology will be described that can perform the processing according to the content sharing approach according to an embodiment of the present technology, described above.

First Embodiment

Figure 5:
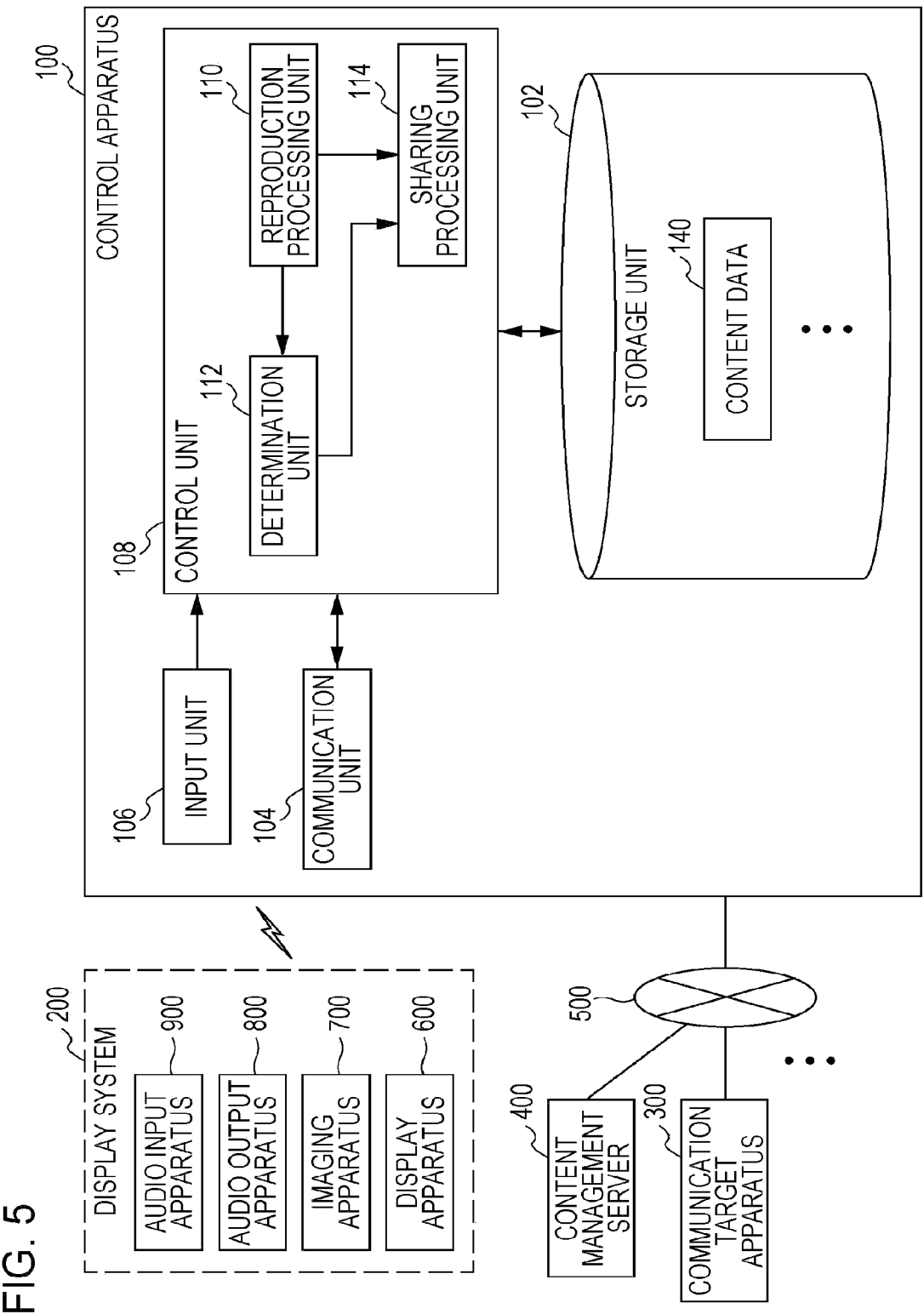
FIG. 5 is a block diagram illustrating an example of a configuration of a control apparatus according to a first embodiment of the present technology.

FIG. 5 is a block diagram illustrating an example of the configuration of the control apparatus 100 according to a first embodiment of the present technology.

Here, in FIG. 5, a display system 200 used for performing the display of an image (still image or moving image) on the display screen, the generation of a captured image base on the imaging of a display direction of the display screen, and audio input•audio output for realizing a telephone call based on audio, a communication target apparatus 300, and a content management server 400, connected through a network 500, are illustrated in combination. Here, the above-mentioned term "connected through a network 500" means that one apparatus and another apparatus communicate with each other through the network 500, or the apparatuses are in states in which the apparatuses can communicate with each other. In addition, for example, as the network 500, a wired network such as a local area network (LAN), a wide area network (WAN), or the like, a wireless network such as a wireless wide area network (wireless WAN; WWAN) through a base station, or the like, or Internet utilizing a communication protocol such as Transmission Control Protocol/Internet Protocol (TCP/IP) or the like may be cited. In addition, the control apparatus 100, the communication target apparatus 300, and the content management server 400 not only establish communication through the network 500 but may directly establish communication, for example. In addition, each of the communication target apparatus 300 may be an apparatus having the same function as that of the control apparatus 100 (namely, another control apparatus 100). Hereinafter, in some case, one or more communication target apparatuses that establish communication relating to a telephone call with the control apparatus 100 are collectively indicated as "communication target apparatus 300".

For example, according to the configuration illustrated in FIG. 5, a user who uses the control apparatus 100 and the display system 200 can have a telephone call based on a captured image and audio such as, for example, a video telephone call, with a user of the communication target apparatus 300. In addition, for example, the display system 200 in FIG. 5 may be replaced with an audio input-output system (not illustrated) used for performing audio input•audio output for realizing a telephone call based on audio, the audio input-output system including a microphone, a speaker, and the like. In the above-mentioned case, a user who uses the control apparatus 100 and the audio input-output system (not illustrated) has a telephone call based on audio with the user of the communication target apparatus 300.

In addition, while FIG. 5 illustrates an example in which the display system 200 includes a display apparatus 600 for performing display, an imaging apparatus 700 for imaging, an audio output apparatus 800 for outputting audio, and an audio input apparatus 900 for inputting audio, the configuration of the display system 200 according to an embodiment of the present technology is not limited to the above-mentioned example. For example, the display system 200 may be an apparatus in which the display apparatus 600, the imaging apparatus 700, and the audio output apparatus 800 are united together (for example, a display apparatus having an imaging function and an audio output function). In addition, for example, the display system 200 may be one apparatus having a display function, an imaging function, an audio output function, and an audio input function.

Here, the display system 200 generates a captured image obtained by imaging a display direction of the display screen, and thereby a captured image in which a user watching the display screen is imaged is obtained. Accordingly, by processing the captured image generated by the display system 200, the control apparatus 100 can easily perform image processing or the like when the predetermined movement of the user is detected on the basis of a captured image, in the processing operations in Steps S102, S108, and S118, for example.

With reference to FIG. 5, the control apparatus 100 includes a storage unit 102, a communication unit 104, an input unit 106, and a control unit 108.

In addition, for example, the control apparatus 100 may include a non-transitory computer readable medium such as read only memory (ROM; not illustrated), a random access memory (RAM; not illustrated), a user-operable operation unit (not illustrated), and the like. For example, the control apparatus 100 connects individual configuration elements to one another, using a bus as the transmission path of data.

Here, for example, the ROM (not illustrated) stores a program used by the control unit 108 and control data such as an operation parameter and the like. For example, the RAM (not illustrated) temporarily stores a program executed by the control unit 108, and the like. In addition, as the operation unit (not illustrated), a button, a direction key, a combination thereof, or the like may be cited. In addition, the control apparatus 100 may be connected to an operation input device (for example, a keyboard, a mouse, or the like) functioning as the external apparatus of the control apparatus 100.

[Example of Hardware Configuration of Control Apparatus 100]

Figure 6:
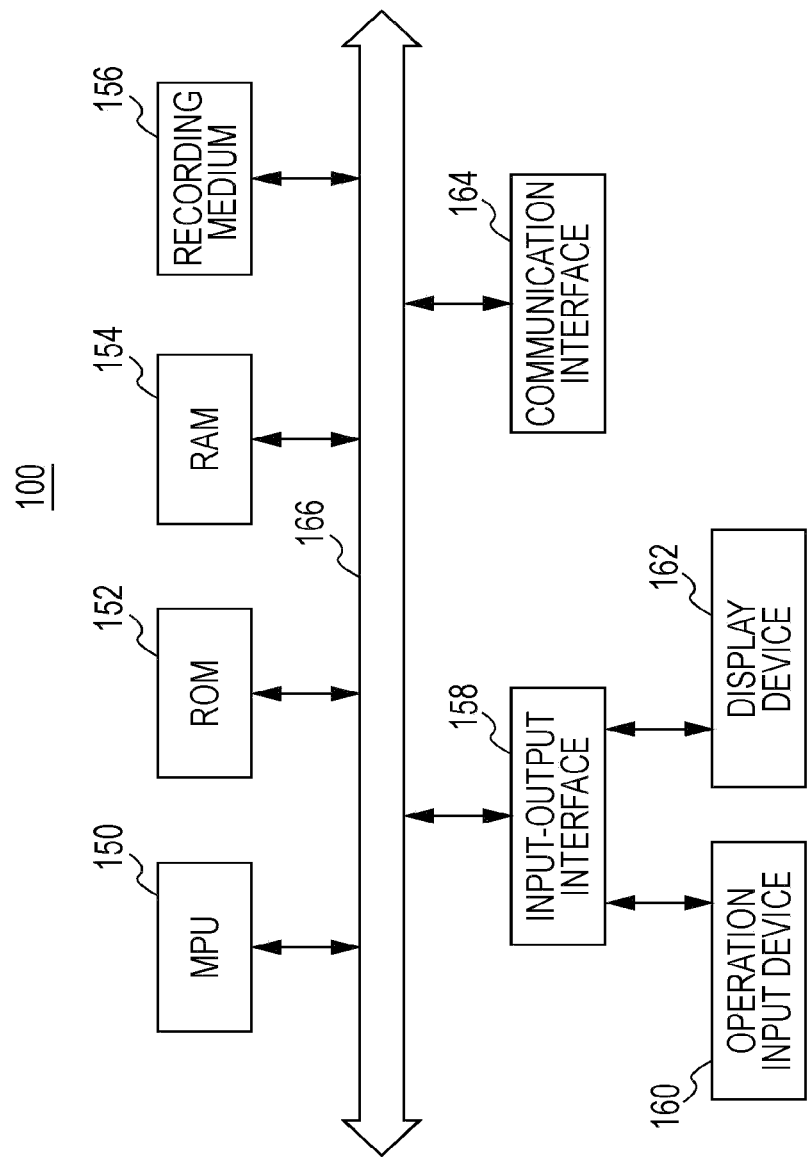
FIG. 6 is an explanatory diagram illustrating an example of a hardware configuration of the control apparatus according to an embodiment of the present technology.

FIG. 6 is an explanatory diagram illustrating an example of the hardware configuration of the control apparatus 100 according to an embodiment of the present technology. With reference to FIG. 6, for example, the control apparatus 100 includes an MPU 150, a ROM 152, a RAM 154, a recording medium 156, an input-output interface 158, an operation input device 160, a display device 162, and a communication interface 164. In addition, for example, the control apparatus 100 connects individual configuration elements to one another, using a bus 166 as the transmission path of data.

The MPU 150 includes an integrated circuit or the like into which a plurality of circuits for realizing various kinds of functions are integrated, such as a micro processing unit (MPU), a circuit for realizing image processing such as an encoder, a decoder, or the like, a circuit for realizing audio processing such as an adaptive filter, an adder, or the like, and the like, and the MPU 150 functions as a control unit (not illustrated) for controlling the whole control apparatus 100. In addition, in the control apparatus 100, the MPU 150 functions as a reproduction processing unit 110, a determination unit 112, and a sharing processing unit 114.

The ROM 152 stores a program used by the MPU 150, control data such as an operation parameter and the like, and the like. For example, the RAM 154 temporarily stores a program executed by the MPU 150, and the like.

The recording medium 156 functions as the storage unit 102, and stores content data, audio localization data into which an audio localization parameter is recorded, an application, and the like, for example. Here, for example, a magnetic recording medium such as a hard disk or the like or a nonvolatile memory such as an electrically erasable and programmable read only memory (EEPROM), a flash memory, a magnetoresistive random access memory (MRAM), a ferroelectric random access memory (FeRAM), a phase change random access memory (PRAM), or the like may be cited as the recording medium 156. In addition, the control apparatus 100 may include the recording medium 156 that can be attached and removed to and from the control apparatus 100.

For example, the input-output interface 158 connects the operation input device 160 and the display device 162. In addition, the input-output interface 158 may also function as the input unit 106. The operation input device 160 functions as an operation unit (not illustrated), and, in addition, the display device 162 functions as a display unit (described later). Here, for example, an audio input terminal and an audio output terminal, a universal serial bus (USB) terminal, a digital visual interface (DVI) terminal, a high-definition multimedia interface (HDMI) terminal, various kinds of processing circuits, or the like may be cited as the input-output interface 158. In addition, for example, the operation input device 160 is provided on the control apparatus 100, and is connected to the input-output interface 158 within the control apparatus 100. For example, a button, a direction key, a rotational selector such as a jog dial, a combination thereof, or the like may be cited as the operation input device 160. In addition, for example, the display device 162 is provided on the control apparatus 100, and is connected to the input-output interface 158 within the control apparatus 100. For example, a liquid crystal display (LCD), an organic Electro Luminescence display (organic EL display; or also referred to as organic light emitting diode display (OLED display)), or the like may be cited as the display device 162. In addition, it should be understood that the input-output interface 158 can be connected to external devices such as an operation input device (for example, a keyboard, a mouse, or the like) functioning as the external apparatus of the control apparatus 100, a display device (for example, an external display device such as the display apparatus 600 or the like), an imaging device (for example, the imaging apparatus 700 or the like), and the like. In addition, for example, the display device 162 may be a user-operable device such as a touch screen or the like, which can perform display.

The communication interface 164 is a communication mechanism included in the control apparatus 100, and functions as the communication unit 104 used for establishing wireless/wired communication, through the network 500 (or, directly), with external apparatuses such as the display system 200, the communication target apparatus 300, the content management server 400, a server for storing content data (not illustrated), and the like, for example. Here, for example, a communication antenna and an RF circuit (wireless communication), an IEEE 802.15.1 port and a transmitting and receiving circuit (wireless communication), an IEEE 802.11b port and a transmitting and receiving circuit (wireless communication), an LAN terminal and a transmitting and receiving circuit (wired communication), or the like may be cited as the communication interface 164.

For example, according to the configuration illustrated in FIG. 6, the control apparatus 100 performs processing according to the content sharing approach according to an embodiment of the present technology. In addition, the hardware configuration of the control apparatus 100 according to an embodiment of the present technology is not limited to the configuration illustrated in FIG. 6.

For example, the control apparatus 100 may include an imaging device that functions as an imaging unit (described later) and includes a lens/imaging element and a signal processing circuit, for example. In the above-mentioned case, the control apparatus 100 may perform processing on a captured image generated by the self apparatus, and establish communication, which relates to a telephone call (for example, video telephone call) based on a captured image and audio, with the communication target apparatus 300. Here, for example, the lens/imaging element includes a lens of an optical system and an image sensor in which a plurality of imaging elements such as charge coupled devices (CCD), complementary metal oxide semiconductors (CMOS), or the like are used. For example, the signal processing circuit includes an automatic gain control (AGC) circuit and an analog to digital converter (ADC), converts an analog signal generated by the imaging elements into a digital signal (image data), and performs various kinds of signal processing. Examples of signal processing performed by the signal processing circuit may include White Balance correction processing, interpolation processing, color tone correction processing, gamma correction processing, YCbCr conversion processing, edge enhancement processing, coating processing, and the like.

In addition, for example, the control apparatus 100 may include a microphone and an amplifier, which may function as an audio input unit (described later). In the above-mentioned case, for example, the control apparatus 100 can establish communication relating to a telephone call with the communication target apparatus 300, using a generated audio signal generated in the self apparatus.

In addition, for example, the control apparatus 100 may include an audio output device that functions as an audio output unit (described later) and includes a digital signal processor (DSP), an amplifier, a speaker, and the like. In the above-mentioned case, for example, the control apparatus 100 can output various kinds of audio such as audio indicated reproduced content data, speech audio relating to a telephone call had with the communication target apparatus 300, and the like.

Furthermore, for example, the control apparatus 100 may have a configuration that does not include the operation device 160 and the display device 162, illustrated in FIG. 6.

The configuration of the control apparatus 100 according to the first embodiment of the present technology will be described with reference to FIG. 5 again. The storage unit 102 is a storing mechanism included in the control apparatus 100. Here, for example, a magnetic recording medium such as a hard disk or the like, a nonvolatile memory such as a flash memory or the like, or the like may be cited as the storage unit 102.

In addition, for example, the storage unit 102 stores content data, audio localization data, an application, and the like. FIG. 5 illustrates an example in which the content data 140 are stored in the storage unit 102.

The communication unit 104 is a communication mechanism included in the control apparatus 100, and establishes wireless/wired communication, through the network 500 (or, directly), with external apparatuses such as the display system 200, the communication target apparatus 300, the content management server 400, and the like. The control apparatus 100 includes the communication unit 104, and thereby can establish communication with one or more communication target apparatuses 300 and establish communication relating to a telephone call (communication relating to a telephone call based on audio or a telephone call based on a captured image and audio). In addition, for example, with respect to the communication unit 104, communication is controlled by the control unit 108.

Here, while, for example, a communication antenna and an RF circuit, a LAN terminal and a transmitting and receiving circuit, or the like may be cited as the communication unit 104, the communication unit 104 is not limited to the above-mentioned examples. For example, the communication unit 104 may have an arbitrary configuration in which the communication unit 104 can communicate with an external apparatus through the network 500.

For example, the input unit 106 receives a captured image that the imaging apparatus 700 generates by imaging, and an audio signal (generated audio signal) that the audio input apparatus 900 generates. In addition, the input unit 106 transmits a received (input) captured image and a received (input) audio signal to the control unit 108. Here, while, for example, an audio input terminal, an audio output terminal, a USB terminal, a DVI terminal, an HDMI terminal, various kinds of processing circuits, or the like may be cited as the input unit 106, the input unit 106 is not limited to the above-mentioned examples. For example, the input unit 106 may have an arbitrary configuration that can receive a captured image and an audio signal by a wired or wireless connection from an external apparatus.

For example, the control unit 108 includes an MPU, a circuit for realizing image processing such as an encoder, a decoder, or the like, a circuit for realizing audio processing, such as an adaptive filter, an adder, or the like, and fulfills a role for controlling the whole control apparatus 100. In addition, the control unit 108 includes a reproduction processing unit 110, a determination unit 112, and a sharing processing unit 114, and fulfills an initiative role for performing processing according to the content sharing approach according to an embodiment of the present technology. In addition, the control unit 108 may include a communication control unit (not illustrated) for controlling communication with an external apparatus such as the communication target apparatus 300 or the like.

For example, the reproduction processing unit 110 reproduces content data stored in the storage unit 102 or content data that is transmitted from an external apparatus such as the communication target apparatus 300 or a server (not illustrated) and received by the communication unit 104.

The determination unit 112 fulfills a role for determining a reproduction state in the control apparatus 100 and transmitting the determination result to the sharing processing unit 114.

More specifically, for example, in a case in which content data is not reproduced in the reproduction processing unit 110 when communication relating to a telephone call is established with the communication target apparatus 300, the determination unit 112 transmits to the sharing processing unit 114 the determination result indicating that the processing (content non-sharing processing) in the above-mentioned (2) and the processing (content sharing processing) in the above-mentioned (3) are not to be performed.

In addition, for example, in a case in which communication relating to a telephone call is established with the communication target apparatus 300, when content data is reproduced in the reproduction processing unit 110 or when content data is to be reproduced from now, the determination unit 112 determines whether or not audio indicated by the content data is to be shared with the communication target apparatus 300. Here, when the determination unit 112 determines whether or not the audio indicated by the content data is to be shared with the communication target apparatus 300, the determination unit 112 communicates with the content management server 400 through the communication unit 104, for example. In addition, when the content management server 400 allows the content data to be shared, the determination unit 112 determines that the audio indicated by the content data is to be shared.

In addition, on the basis of determination result as to whether or not a content indicated by the content data is to be shared with the communication target apparatus 300, the determination unit 112 transmits to the sharing processing unit 114 the determination result used for causing the processing (content non-sharing processing) illustrated in the above-mentioned (2) or the processing (content sharing processing) illustrated in the above-mentioned (3) to be selectively performed.

Here, for example, a processing operation in Step S100, S102, S104, S108, S112, or S118 may be cited as processing performed in the determination unit 112 in the processing according to the content sharing approach illustrated in FIG. 4. In addition, the processing performed in the determination unit 112 in the processing according to the content sharing approach illustrated in FIG. 4 is not limited to the above-mentioned examples. For example, in the control apparatus 100 according to an embodiment of the present technology, a communication control unit (not illustrated) may perform a processing operation in Step S100 or S108 in the processing according to the content sharing approach illustrated in FIG. 4, for example.

On the basis of the determination result transmitted from the determination unit 112, the sharing processing unit 114 selectively performs the processing (content non-sharing processing) illustrated in the above-mentioned (2) or the processing (content sharing processing) illustrated in the above-mentioned (3). More specifically, when, in the determination unit 112, it is not determined that the audio indicated by the content data is to be shared with the communication target apparatus 300, the sharing processing unit 114 performs the processing (content non-sharing processing) illustrated in the above-mentioned (2). In addition, when, in the determination unit 112, it is determined that the audio indicated by the content data is to be shared with the communication target apparatus 300, the sharing processing unit 114 selectively performs the processing (content sharing processing) illustrated in the above-mentioned (3).

Here, for example, a processing operation in Step S106, S114, or S116 may be cited as processing performed in the sharing processing unit 114 in the processing according to the content sharing approach illustrated in FIG. 4.

For example, the control unit 108 includes the reproduction processing unit 110, the determination unit 112, and the sharing processing unit 114, and thereby can fulfill an initiative role for performing processing according to the content sharing approach. In addition, it should be understood that the configuration of the control unit 108 is not limited to the configuration illustrated in FIG. 5.

For example, according to the configuration illustrated in FIG. 5, the control apparatus 100 according to the first embodiment can realize the processing according to the content sharing approach according to an embodiment of the present technology. Accordingly, for example, according to the configuration illustrated in FIG. 5, when communication with the communication target apparatus 300, which relates to a telephone call, is established, the control apparatus 100 can cause a content indicated by the content data to be selectively shared with the communication target apparatus 300 with preventing the invasion of the privacy of the user. In addition, it should be understood that the configuration of the control apparatus 100 according to the first embodiment of the present technology is not limited to the configuration illustrated in FIG. 5.

Second Embodiment

Figure 7:
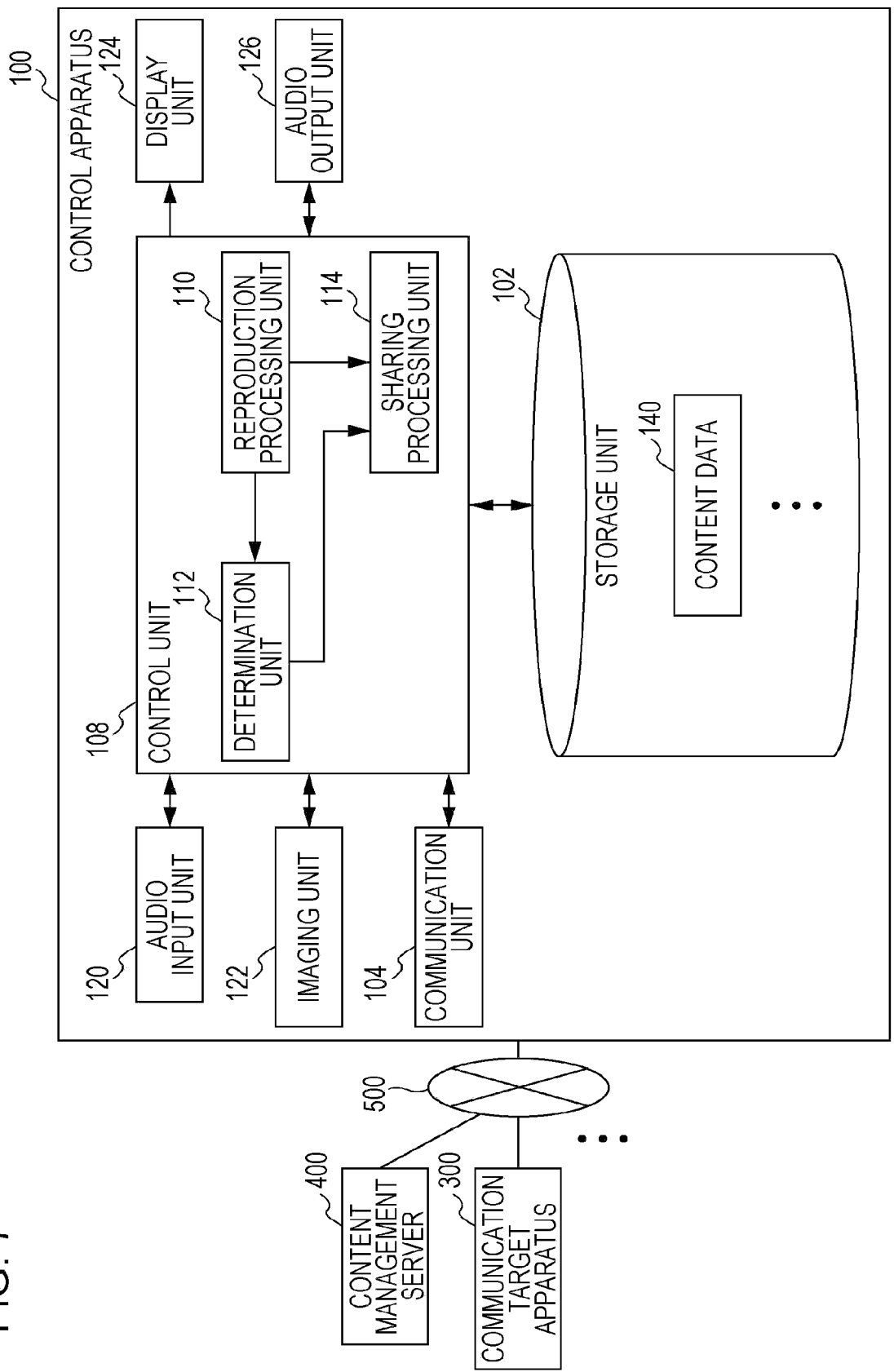
FIG. 7 is a block diagram illustrating an example of a configuration of a control apparatus according to a second embodiment of the present technology.

FIG. 7 is a block diagram illustrating an example of the configuration of a control apparatus 100 according to a second embodiment of the present technology. Here, in the same way as in FIG. 5, in FIG. 7, a communication target apparatus 300, and a content management server 400, connected through a network 500, are illustrated in combination.

While the control apparatus 100 according to the second embodiment, illustrated in FIG. 7, has basically the same as that of the control apparatus 100 according to the first embodiment, illustrated in FIG. 5, the control apparatus 100 according to the second embodiment does not include the input unit 106, and further includes an audio input unit 120, an imaging unit 122, a display unit 124, and an audio output unit 126, compared with the control apparatus 100 according to the first embodiment, illustrated in FIG. 5.

The audio input unit 120 is an audio signal generation mechanism included in the control apparatus 100. For example, a microphone may be cited as the audio input unit 120. In addition, the audio input unit 120 may be attached and removed to and from the control apparatus 100.

The imaging unit 122 is an imaging mechanism included in the control apparatus 100, and images the display direction of a display screen displayed by the display unit 124, thereby generating a captured image. In addition, when the control apparatus 100 according to the second embodiment has no function for performing communication relating to a telephone call based on a captured image and audio, the control apparatus 100 may has a configuration in which the imaging unit 122 is not included. Here, for example, an imaging device including a lens/imaging element and a signal processing circuit may be cited as the imaging unit 122.

The display unit 124 is a displaying mechanism included in the control apparatus 100, and displays various kinds of information or images on the display screen. For example, a content display screen for displaying an image indicated by content data, a screen on which a captured image relating to a telephone call is displayed, an operation screen for causing the control apparatus 100 to perform a desired operation, or the like may be cited as a screen displayed on the display screen of the display unit 124. In addition, on the screen on which the captured image relating to a telephone call is displayed, the captured image may be displayed in parallel with an image indicated by a content, or displayed with being superimposed on the image indicated by the content. In addition, for example, a liquid crystal display or an organic EL display may be cited as the display unit 124.

The audio output unit 126 is an audio output mechanism included in the control apparatus 100, and outputs various kinds of audio such as audio indicated by reproduced content data, speech audio relating to a telephone call, system audio in the control apparatus 100, and the like, for example. Here, for example, a DSP and an audio output device including an amplifier and a speaker may be cited as the audio output unit 126.

The control apparatus 100 according to the second embodiment has basically the same configuration as that of the control apparatus 100 according to the first embodiment, illustrated in FIG. 5. Accordingly, on the basis of the configuration illustrated in FIG. 7, the control apparatus 100 according to the second embodiment can realize the processing according to the content sharing approach according to an embodiment of the present technology, in the same way as the control apparatus 100 according to the first embodiment. Accordingly, for example, according to the configuration illustrated in FIG. 7, when the control apparatus 100 establishes communication relating to a telephone call with the communication target apparatus 300, the control apparatus 100 can cause a content indicated by the content data to be selectively shared with the communication target apparatus 300, with preventing the invasion of privacy of the user. In addition, the configuration of the control apparatus 100 according to the second embodiment of the present technology is not limited to the configuration illustrated in FIG. 7. For example, the control apparatus 100 according to the second embodiment may include the input unit 106 in the same way as the control apparatus 100 according to the first embodiment, illustrated in FIG. 5.

As described above, the control apparatus 100 according to an embodiment of the present technology selectively performs the processing (content non-sharing processing) illustrated in the above-mentioned (2) or the processing (content sharing processing) illustrated in the above-mentioned (3), on the basis of the determination result as to whether or not the audio indicated by the content data is to be shared with the communication target apparatus 300. Here, when it is determined that the content indicated by the content data is to be shared with the communication target apparatus 300 (namely, in a case of the content sharing state), the control apparatus 100 causes a speech audio signal and a content audio signal, which relate to a telephone call, to be transmitted to the communication target apparatus 300. Accordingly, since it is possible to provide, to the users, a sense that they enjoy the content at a same location even if the control apparatus and the communication target apparatus 300 are located at remote locations, the control apparatus 100 can achieve the improvement of convenience for users. In addition, when it is not determined that the content indicated by the content data is to be shared with the communication target apparatus 300 (namely, in a case of the content non-sharing state), the control apparatus 100 causes the speech audio signal to be transmitted to the communication target apparatus and does not cause the content audio signal to be transmitted to the communication target apparatus 300. Accordingly, since the control apparatus 100 can prevent the user of the communication target apparatus 300 from hearing audio indicated by the content data reproduced in the control apparatus 100, the control apparatus 100 can prevent the privacy of the user from being invaded.

Accordingly, when the control apparatus 100 establishes communication relating to a telephone call with the communication target apparatus 300, the control apparatus 100 can cause a content indicated by the content data to be selectively shared with the communication target apparatus 300, with preventing the invasion of privacy of the user.

While the control apparatus 100 has been cited as an embodiment of the present technology and described so far, an embodiment of the present technology is not limited to such an embodiment. For example, an embodiment of the present technology may be applied to various types of devices, such as a computer such as a PC, a server, or the like, a display apparatus such as a television receiver, a signage apparatus, or the like, a portable communication apparatus such as a mobile phone or the like, a video/music reproducing apparatus (or video/music recording and reproducing apparatus), a game machine, a set-top box, and the like.

In addition, while the display system 200 has been cited as an embodiment of the present technology and described, an embodiment of the present technology is not limited to such an embodiment. For example, an embodiment of the present technology may be applied to various types of devices, such as a computer such as a PC or the like, a display apparatus such as a television receiver, a signage apparatus, or the like, a portable communication apparatus such as a mobile phone or the like, and the like. In addition, the display system 200 according to an embodiment of the present technology may be the combination of a device for performing display, a device for imaging, a device for generating an audio signal, and a device for outputting an audio signal.

In addition, while the communication target apparatus 300 has been cited as an embodiment of the present technology and described, an embodiment of the present technology is not limited to such an embodiment. For example, an embodiment of the present technology may be applied to various types of devices, such as a computer such as a PC, a server, or the like, a display apparatus such as a television receiver, a signage apparatus, or the like, a portable communication apparatus such as a mobile phone or the like, a video/music reproducing apparatus (or video/music recording and reproducing apparatus), a game machine, a set-top box, and the like.

In addition, while the content management server 400 has been cited as an embodiment of the present technology and described, an embodiment of the present technology is not limited to such an embodiment. For example, an embodiment of the present technology may be applied to various types of devices such as a computer such as a PC, a server, or the like, and the like.

(Program According to Embodiment of Present Technology)

On the basis of a program used for causing a computer to function as a control apparatus according to an embodiment of the present technology (for example, a program used for realizing the processing according to the content sharing approach according to an embodiment of the present technology, illustrated in FIG. 4), it is possible to cause a content indicated by the content data to be selectively shared with the communication target apparatus, with preventing the invasion of privacy of the user, when communication relating to a telephone call is established with the communication target apparatus.

While preferred embodiments of the present technology have been described with reference to figures so far, it should be understood that the present technology is not limited to such examples. It should be understood by those skilled in the art that various modifications and alterations may occur insofar as they are within the scope of the appended claims, and it should be understood that those also belong to the technical scope of the present technology.

For example, the control apparatus 100 according to an embodiment of the present technology may individually include the reproduction processing unit 110, the determination unit 112, and the sharing processing unit 114, illustrated in FIGS. 5 and 7, (for example, individually realizes the reproduction processing unit 110, the determination unit 112, and the sharing processing unit 114, using individual processing circuits).

In addition, while, in the above-description, a case in which a program (computer program) used for causing the computer to function as the control apparatus according to an embodiment of the present technology is provided has been illustrated, furthermore, an embodiment of the present technology may also provide the program and a recording medium in which the program is stored, in combination.

The above-mentioned configuration indicates an example of an embodiment of the present technology, and it should be understood that the configuration also belongs to the technical scope of the present technology.

It should be understood by those skilled in the art that various modifications, combinations, sub-combinations and alterations may occur depending on design requirements and other factors insofar as they are within the scope of the appended claims or the equivalents thereof.

What is claimed is:

1. A control apparatus for selective content sharing, the control apparatus comprising a processor to cause a captured image and an image represented by reproduced content to be displayed on a display in a first manner when the reproduced content is determined to be shared with a communication target apparatus and in a second manner which is different from the first manner when the reproduced content is determined not to be shared with the communication target apparatus, so as to provide a visual indication to a user as to whether or not the reproduced content is being shared with the communication target apparatus, in which in the first manner the captured image and the image represented by the reproduced content are arranged so as to appear to be in a virtual space on the display, in which in the second manner the captured image and the image represented by the reproduced content are arranged in different regions on the display without appearing to be in the virtual space, and in which an appearance of the virtual space is provided by using a three-dimensional type display such that (i) in the first manner the captured image and the image represented by the reproduced content are arranged in the three-dimensional type display so as to appear to be in the virtual space and (ii) in the second manner the captured image and the image represented by the reproduced content are not arranged in the three-dimensional type display so as to not appear to be in the virtual space.

2. The control apparatus of claim 1, wherein the reproduced content also represents audio and in which the processor is configured to add an inverted content audio signal to the audio represented by the reproduced content.

3. The control apparatus of claim 2, wherein the inverted content audio signal is obtained by inverting a phase of the audio represented by the reproduced content.

4. The control apparatus of claim 1, wherein the processor is configured to mask the image represented by the reproduced content.

5. The control apparatus of claim 4, wherein the processor is configured to mask the image represented by the reproduced content by removing a portion of the image represented by the reproduced content.

6. The control apparatus of claim 4, wherein the processor is configured to mask the image represented by the reproduced content by adding a mosaic to a portion of the image represented by the reproduced content.

7. The control apparatus of claim 1, wherein a generated speech audio signal is shared with the communication target apparatus and includes a signal representing speech received from the user of the control apparatus.

8. The control apparatus of claim 1, wherein the processor is configured to add an inverted speech audio signal to a generated speech audio signal shared with the communication target apparatus.

9. The control apparatus of claim 8, wherein the inverted speech audio signal is obtained by inverting a phase of a speech signal received from the user of the communication target apparatus.

10. The control apparatus of claim 1, wherein the processor is configured to modify the captured image and to share the modified captured image with the communication target apparatus.

11. The control apparatus of claim 10, wherein the processor is configured to modify the captured image by replacing a portion of the captured image with an avatar.

12. The control apparatus of claim 1, wherein the control apparatus further comprises the display.

13. The control apparatus of claim 1, wherein the reproduced content also represents audio and in which the processor is configured to modify the audio represented by the reproduced content.

14. The control apparatus of claim 13, wherein the processor is configured to modify the audio represented by the reproduced content by adding a reverberant sound effect to the audio represented by the reproduced content.

15. The control apparatus of claim 1, where the control apparatus is included in a telephone, computer, set top box, mobile phone, or game machine.

16. A method for use with a control apparatus for performing selective content sharing, the method comprising causing a captured image and an image represented by reproduced content to be displayed on a display in a first manner when the reproduced content is determined to be shared with a communication target apparatus and in a second manner which is different from the first manner when the reproduced content is determined not to be shared with the communication target apparatus, so as to provide a visual indication to a user as to whether or not the reproduced content is being shared with the communication target apparatus, in which in the first manner the captured image and the image represented by the reproduced content are arranged so as to appear to be in a virtual space on the display, in which in the second manner the captured image and the image represented by the reproduced content are arranged in different regions on the display without appearing to be in the virtual space, and in which an appearance of the virtual space is provided by using a three-dimensional type display such that (i) in the first manner the captured image and the image represented by the reproduced content are arranged in the three-dimensional type display so as to appear to be in the virtual space and (ii) in the second manner the captured image and the image represented by the reproduced content are not arranged in the three-dimensional type display so as to not appear to be in the virtual space.

* * * * *